United States Patent
Itakura

(10) Patent No.: US 10,732,956 B2
(45) Date of Patent: Aug. 4, 2020

(54) INFORMATION PROCESSING DEVICE, INFORMATION UPDATE SYSTEM, INFORMATION PROCESSING METHOD AND STORAGE MEDIUM

(71) Applicant: CASIO COMPUTER CO., LTD., Shibuya-ku, Tokyo (JP)

(72) Inventor: Katsuyuki Itakura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 46 days.

(21) Appl. No.: 15/934,533

(22) Filed: Mar. 23, 2018

(65) Prior Publication Data

US 2018/0300121 A1    Oct. 18, 2018

(30) Foreign Application Priority Data

Apr. 17, 2017   (JP) .................................. 2017-081063

(51) Int. Cl.
| | |
|---|---|
| *G06F 9/44* | (2018.01) |
| *G06F 8/65* | (2018.01) |
| *G07G 1/12* | (2006.01) |
| *G07G 1/00* | (2006.01) |
| *G06Q 20/34* | (2012.01) |
| *G07D 11/00* | (2019.01) |
| *G07F 19/00* | (2006.01) |
| *G07D 11/28* | (2019.01) |

(52) U.S. Cl.
CPC ............. *G06F 8/65* (2013.01); *G06Q 20/356* (2013.01); *G07D 11/00* (2013.01); *G07D 11/28* (2019.01); *G07F 19/206* (2013.01); *G07F 19/211* (2013.01); *G07G 1/0009* (2013.01); *G07G 1/12* (2013.01)

(58) Field of Classification Search
CPC ........................................................ G06F 8/65
USPC ........................................................ 717/168
See application file for complete search history.

(56) References Cited

U.S. PATENT DOCUMENTS

| | | | | |
|---|---|---|---|---|
| 4,564,904 A | * | 1/1986 | Kumagai ................. | G07G 1/12 705/20 |
| 4,811,219 A | * | 3/1989 | Touji ....................... | G06Q 30/04 705/32 |

(Continued)

FOREIGN PATENT DOCUMENTS

JP             2012003329 A        1/2012

*Primary Examiner* — Wei Y Zhen
*Assistant Examiner* — Lanny N Ung
(74) *Attorney, Agent, or Firm* — Holtz, Holtz & Volek PC

(57) ABSTRACT

An information processing device, including: an operator for a user to perform a specification operation of specifying an arbitrary mode from among a plurality of modes; and a processor which starts, at a predetermined timing, update processing of obtaining update data for updating a predetermined program or execution data of the program from a predetermined external terminal and updating the program or the execution data based on the obtained update data when a predetermined mode is specified in accordance with a specification operation of the mode performed to the operator by the user, wherein when a specification operation of specifying another mode instead of the predetermined mode is performed to the operator by the user during the update processing, the processor switches to the another mode after the update processing is finished.

7 Claims, 13 Drawing Sheets

(56) References Cited

U.S. PATENT DOCUMENTS

| | | | | |
|---|---|---|---|---|
| 5,398,191 A * | 3/1995 | Komai | ............... | G01G 19/4144 |
| | | | | 177/25.15 |
| 7,516,450 B2 * | 4/2009 | Ogura | .................... | H04L 29/06 |
| | | | | 717/168 |
| 9,055,128 B2 * | 6/2015 | Iwaya | ....................... | G06F 8/61 |
| 2008/0184219 A1 * | 7/2008 | Matsumoto | ......... | G06F 11/1433 |
| | | | | 717/170 |
| 2009/0037284 A1 * | 2/2009 | Lewis | ................... | G06Q 20/20 |
| | | | | 705/16 |

\* cited by examiner

INFORMATION PROCESSING DEVICE, INFORMATION UPDATE SYSTEM, INFORMATION PROCESSING METHOD AND STORAGE MEDIUM

CROSS-REFERENCE TO RELATED APPLICATIONS

The entire disclosure of Japanese Patent Application No. 2017-081063 filed on Apr. 17, 2017 including description, claims, drawings, and abstract are incorporated herein by reference in its entirety.

BACKGROUND OF THE INVENTION

1. Field of the Invention

The present invention relates to an information processing device, an information update system, an information processing method and a storage medium.

2. Description of Related Art

Generally, electronic equipment updates software in order to correct defects and add new functions, and updates master data which is used in data processing. Electronic equipment which can be connected with a communication network such as the Internet obtains information on software, master data and such like via the communication network from an external server device and updates the software, the master data and such like.

For example, there is suggested an information processing device (for example, see Japanese Patent Application Laid Open Publication No. 2012-3329) which, on a set date and time, obtains version information of latest system software from a file providing server, compares the obtained version information with version information of system software which is already downloaded, and downloads the system software of the obtained version information from the file providing server when the version information obtained from the file providing server is newer.

However, as for an information processing device such as an inexpensive ECR (Electronic Cash Register) which is not connected with the communication network, the information processing device itself cannot access the external server device to obtain information.

Thus, there is considered a method of connecting the ECR with an external terminal such as a smartphone by a communication means such as a Bluetooth (registered trademark) so that the ECR obtains necessary information via the external terminal.

The ECR performs various processing such as registration and settlement of sales, and setting. The ECR includes a switch for switching a plurality of modes, and performs various types of processing according to a mode which is selected by the switch. For example, in a setting mode, the ECR obtains, from the external terminal, information on software and master data which is downloaded in the external device in advance, and updates information in the ECR. There has been a possibility that communication with the external terminal is interrupted and updating of information fails when a switching operation to another mode is performed during the updating of the information by the ECR in the setting mode.

SUMMARY OF THE INVENTION

In order to solve the above problems, according to a preferred embodiment of the present invention, there is provided an information processing device, including: an operator for a user to perform a specification operation of specifying an arbitrary mode from among a plurality of modes; and a processor which starts, at a predetermined timing, update processing of obtaining update data for updating a predetermined program or execution data of the program from a predetermined external terminal and updating the program or the execution data based on the obtained update data when a predetermined mode is specified in accordance with a specification operation of the mode performed to the operator by the user, wherein when a specification operation of specifying another mode instead of the predetermined mode is performed to the operator by the user during the update processing, the processor switches to the another mode after the update processing is finished.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

First, an embodiment of an information processing device and an information update system according to the present invention will be described. The present invention is not limited to the illustrated examples.

Figure 1:
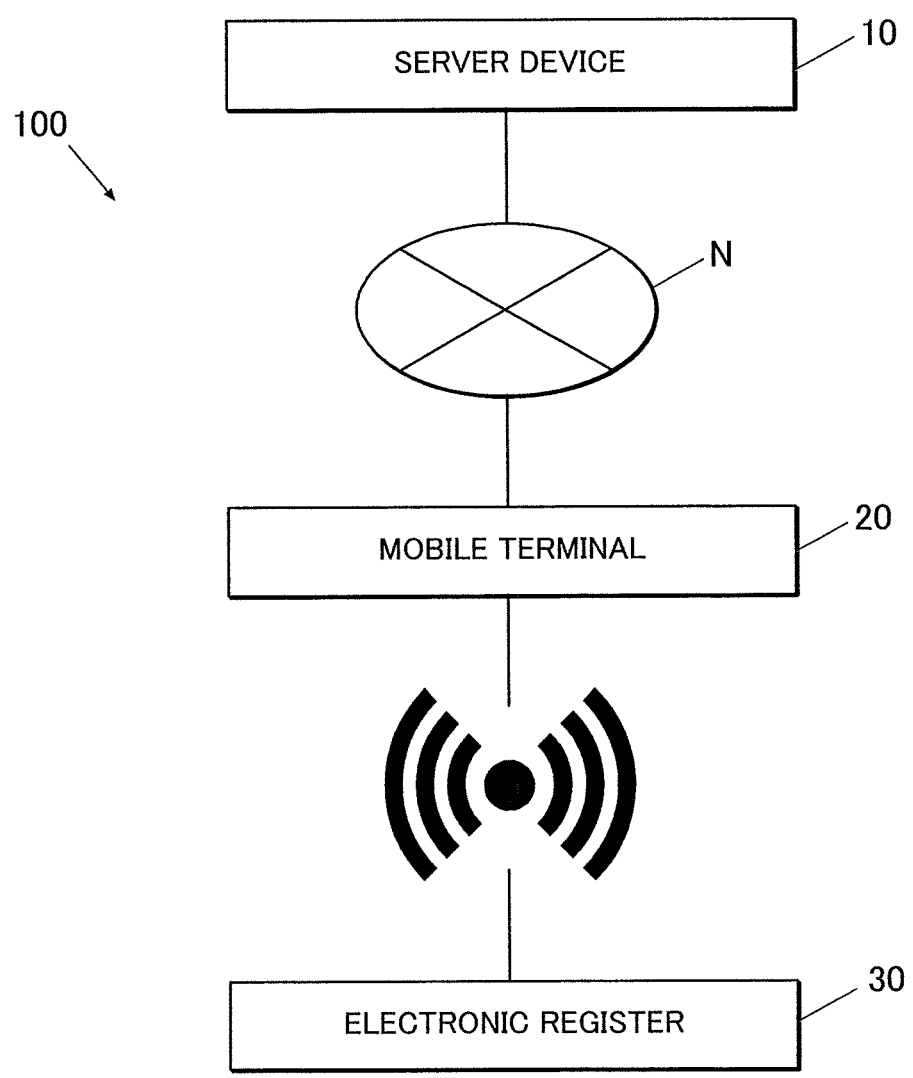
FIG. 1 is a system configuration view of a register maintenance system.

FIG. 1 shows a system configuration of a register maintenance system 100 as the information update system in the embodiment. The register maintenance system 100 includes a server device 10, a mobile terminal 20 as an external terminal and an electronic register 30 as the information processing device. The server device 10 and the mobile terminal 20 are connected to a communication network N. Though the communication network N may be configured by the Internet, the communication network N may include a mobile communication network, a public line, a WI-FI (Wireless Fidelity) or the like.

The server device 10 is a sever on a cloud, and stores and manages various types of application software to be provided to the mobile terminal 20, such as application software for causing the mobile terminal 20 to perform maintenance processing of the electronic register 30 (hereinafter, referred to as register maintenance tool application).

The mobile terminal 20 is an external terminal such as a smartphone, a mobile phone, a tablet PC and a handy terminal. The mobile terminal 20 is carried by a user such as a service engineer who performs maintenance of the electronic register 30 and an operating person who uses the electronic register 30.

The external terminal in the embodiment of the present invention is not limited to the mobile terminal carried by a user, and may be a terminal device which is not assumed to be carried by a user, that is, a standing type terminal device.

The electronic register 30 is placed in a store such as a private shop, a supermarket and a restaurant. The prices of merchandise sold to customers and sales data such as the number of pieces of sold merchandise are registered in the electronic register 30 by an operation of an operating person such as a store clerk.

Next, the configuration of the mobile terminal 20 will be described.

Figure 2:
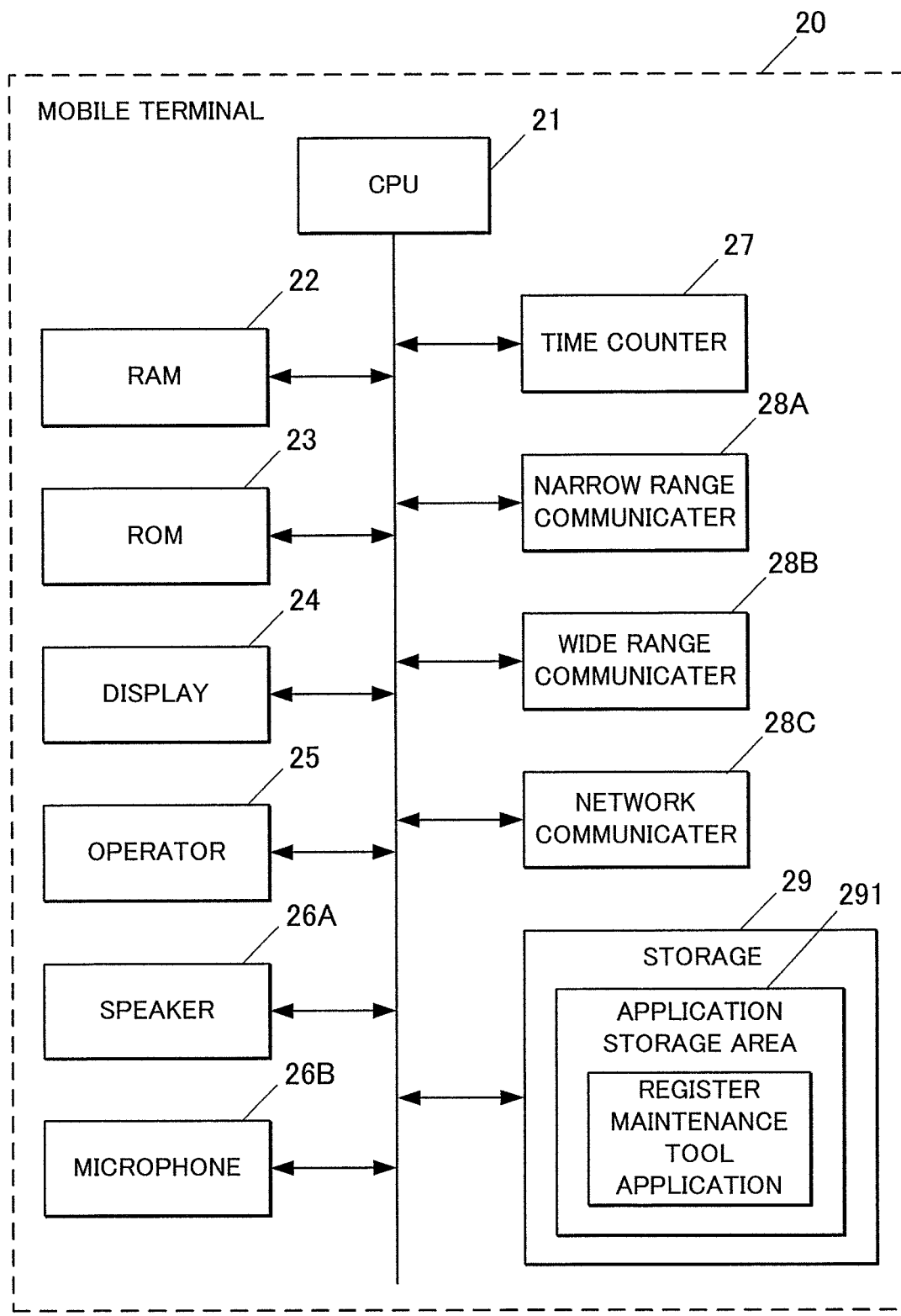
FIG. 2 is a block diagram illustrating a functional configuration inside a mobile terminal.

FIG. 2 is a block diagram showing the functional configuration inside the mobile terminal 20. As shown in FIG. 2, the mobile terminal 20 includes a CPU (Central Processing Unit) 21, a RAM (Random Access Memory) 22, a ROM (Read Only Memory) 23, a display 24, an operator 25, a speaker 26A, a microphone 26B, a time counter 27, a narrow range communicator 28A, a wide range communicator 28B, a network communicator 28C and a storage 29.

The CPU 21 controls the components in the mobile terminal 20. The CPU 21 reads out a specified program among various programs from the ROM 23 or the storage 29, loads the program into the RAM 22, and executes various types of processing in cooperation with the loaded program.

The RAM 22 is configured by including a volatile semiconductor memory, and forms a working area for storing various types of data and programs.

The ROM 23 is a memory dedicated to reading which stores various types of data and various programs. The ROM 23 stores system programs executed by the CPU 21, Web browsers, data necessary for executing the programs and such like.

The display 24 is configured by including an LCD (Liquid Crystal Display), and displays various types of display information on a display screen by control of the CPU 21.

The operator 25 includes various function keys. The operator 25 receives a key input from the user and outputs the operation information to the CPU 21. The operator 25 also has a touch panel which has transparent electrodes arranged in a grid pattern in such a manner as to cover the surface of the display 24. The operator 25 detects the position pressed by a finger or a touch pen, and outputs the positional information as operation information to the CPU 21.

The speaker 26A converts an electrical signal which was received from an external device via the network communicator 28C into a sound signal, and outputs sound.

The microphone 26B detects sound waves, converts the detected sound waves into electrical signals, and outputs the converted signals to the CPU 21 or the network communicator 28c.

The time counter 27 has a time counting circuit (RTC: Real Time Clock), counts the current date and time by the time counting circuit and outputs the current date and time to the CPU 21.

The narrow range communicator 28A is configured by including an antenna, a demodulating circuit, a signal processing circuit and such like, and performs direct wireless communication in a narrow range with the electronic register 30 by a wireless communication system such as a Bluetooth.

The direct wireless communication is a communication system of direct communication between devices, and assumes that the communication is not made via the communication network N including the Internet.

The wide range communicator 283 is configured by including an antenna, a demodulating circuit, a signal processing circuit and such like, and performs direct wireless communication in a wide range with the electronic register 30 by a wireless communication system such as a Wi-Fi.

The network communicator 28C is configured by including an antenna, a demodulating circuit, a signal processing circuit and such like and connected with the communication network N including a mobile communication network via abase station or an access point wirelessly, and communicates with the external device which is connected to the communication network N.

The storage 29 is configured by including a nonvolatile semiconductor memory. The storage 29 has an application storage area 291. The application storage area 291 stores application software such as register maintenance tool application.

Next, the configuration of the electronic register 30 will be described.

Figure 3:
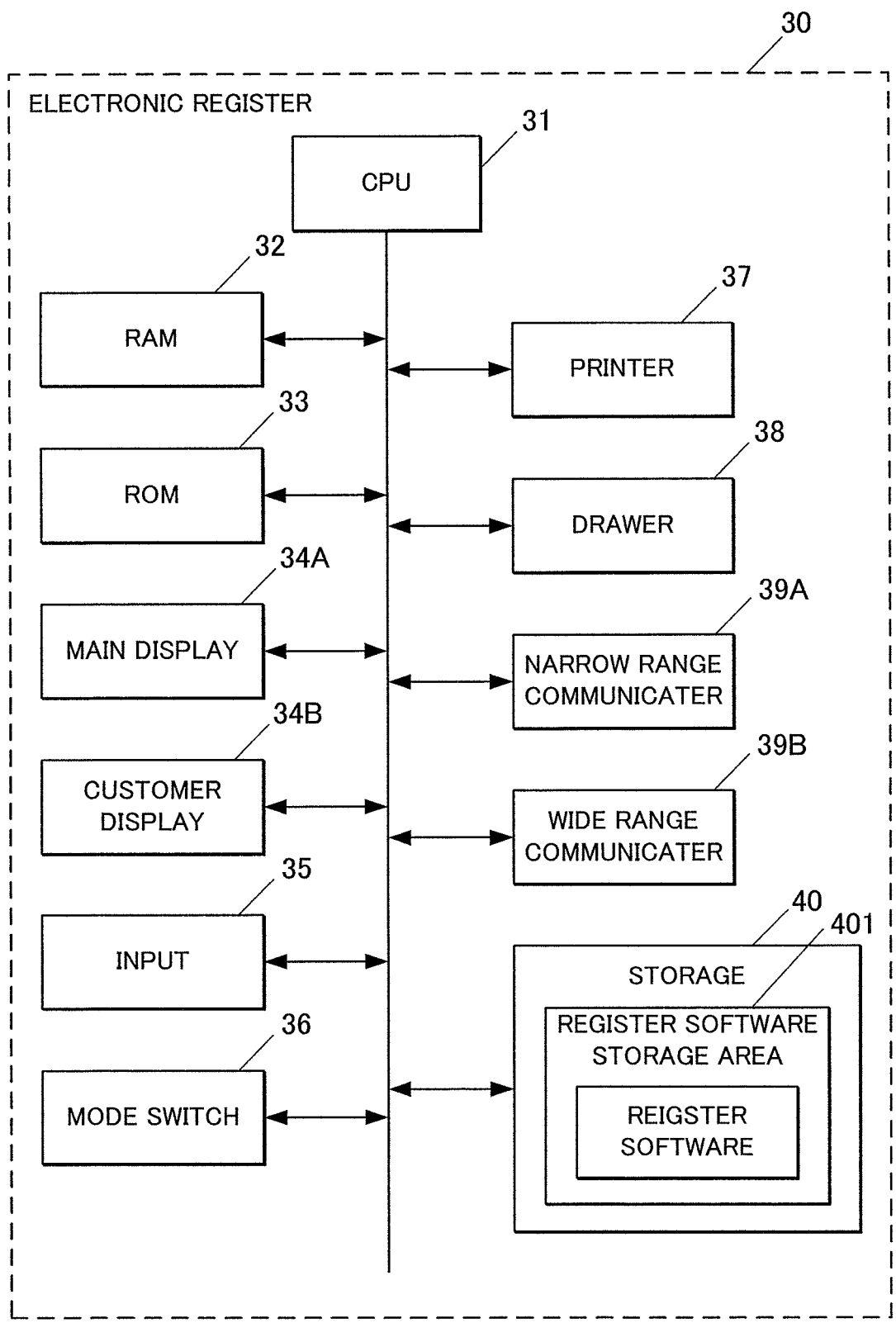
FIG. 3 is a block diagram illustrating a functional configuration inside an electronic register.
Figure 4A:
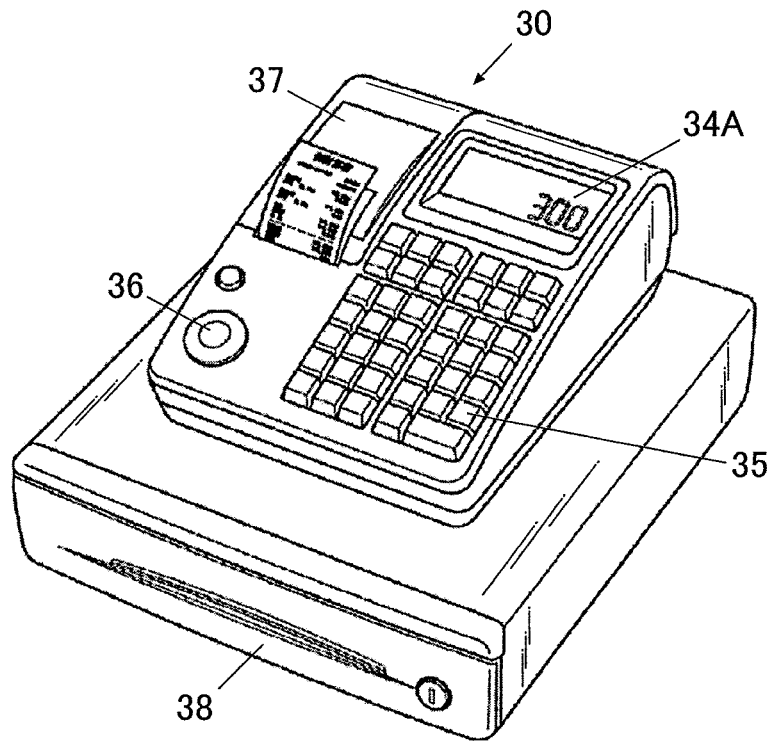
FIGS. 4A and 4B are schematic views illustrating outer appearances of the electronic register.
Figure 4B:
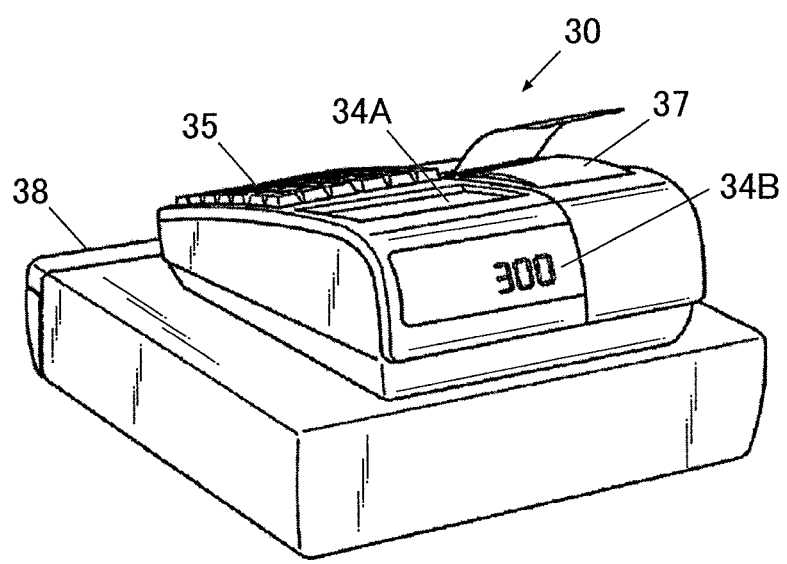

FIG. 3 is a block diagram showing the functional configuration inside the electronic register 30. FIGS. 4A and 4B are schematic views showing the outer appearances of the electronic register 30. The electronic register 30 includes a CPU 31, a RAM 32, a ROM 33, a main display 34A, a customer display 34B, an input 35, a mode switch 36 as an operator and a rotary mode switching switch, a printer 37, a drawer 38, a narrow range communicator 39A as a communicator, a wide range communicator 39B and a storage 40.

The CPU 31 controls the components in the electronic register 30. The CPU 31 reads a specified program among the various programs from the ROM 33 or the storage 40, loads the program into the RAM 32 and executes various types of processing in cooperation with the loaded program.

The RAM 32 is configured by including a volatile semiconductor memory, and forms a working area for storing various types of data and the program.

The ROM 33 is a memory dedicated to reading which stores various types of data and various programs.

As shown in FIG. 4A, the main display 34A is a display device for a store clerk or the like operating the electronic register 30 to view information such as the price of merchandise and a total sum. The main display 34A is configured by including an LCD, an EL (Electro Luminescent) display or the like, and displays various types of display information on a display screen by control of the CPU 31.

As shown in FIG. 4B, the customer display 34B is a display device for a customer who purchased the merchandise to view information such as the price of merchandise and a total sum. The customer display 34B is configured by including an LCD, an EL display or the like, and displays various types of display information on a display screen by control of the CPU 31.

The input 35 includes numerical keys and various function keys, receives key input by an operating person and outputs the operation information to the CPU 31. The input 35 receives key input to a numerical key, a section key or the like at the time of registration of sales data, for example. The input 35 includes a barcode reader, a barcode scanner or the like which reads a barcode provided on the merchandise.

The mode switch 36 is a switch for a user to perform a specification operation (selection) of specifying an arbitrary mode from among a plurality of modes in the electronic register 30.

Figure 5:
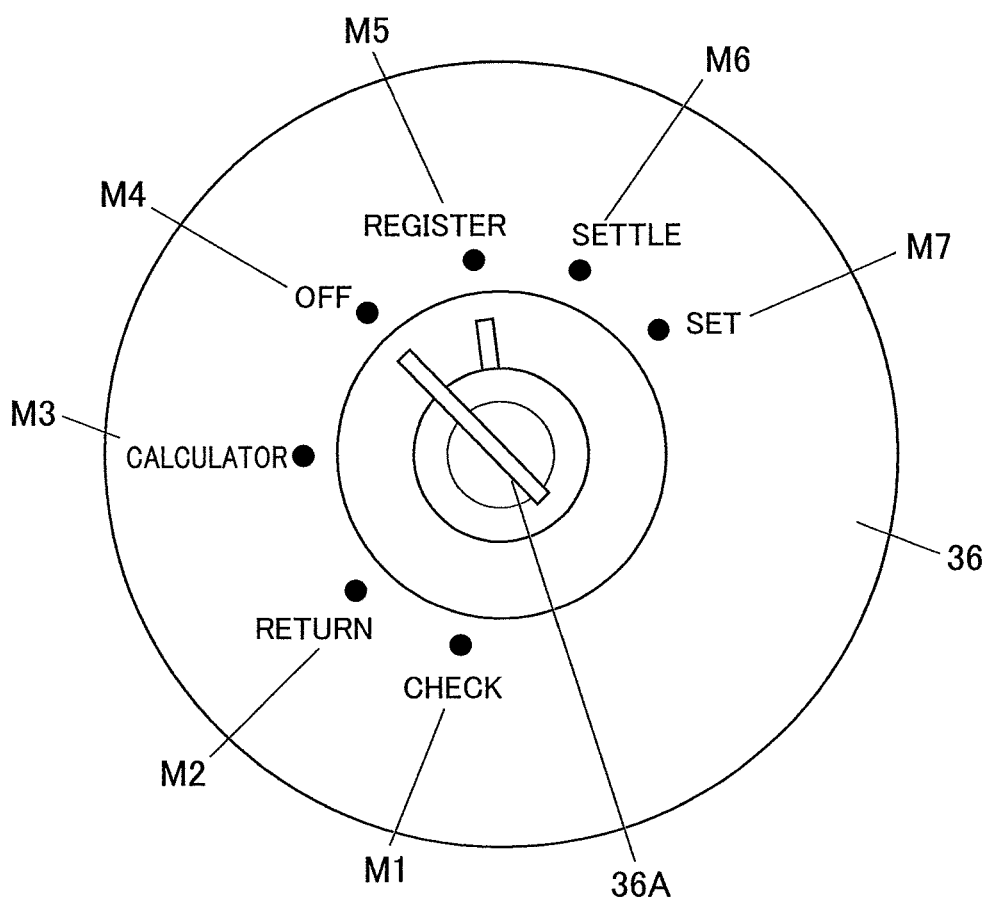
FIG. 5 is a view illustrating a configuration of a mode switch.

FIG. 5 shows the configuration of the mode switch 36.

The mode switch 36 includes a keyhole 36A in which a mode key (key) can be inserted. By rotating the mode key which is inserted in the keyhole 36A to switch the position, the specification operation of the mode corresponding to the position can be performed. The mode switch 36 outputs information indicating the mode which was specified by rotation of the mode key to the CPU 31.

As shown in FIG. 5, the mode switch 36 has rotation positions for switching to the respective modes, the rotation positions being arranged in the order of a check mode M1, a return mode M2, a calculator mode M3, an OFF mode M4, a registration mode M5, a settlement mode M6 and a setting mode M7 clockwise. That is, the modes corresponding to the respective rotation positions are associated with the mode switch 36 at the respective rotation positions.

The mode switch 36 is configured so as to insert and remove the mode key at the positions of the OFF mode M4 and the registration mode M5. The mode key cannot be inserted or removed at the positions of the other modes.

The check mode M1 is a mode of performing check processing of the registered sales data.

The return mode M2 is a mode of performing return processing (return).

The calculator mode M3 is a mode for performing calculation similarly to a normal calculator.

The OFF mode M4 is a mode of turning off the electronic register 30.

The registration mode M5 is a mode of performing registration processing for the sales data of the purchased merchandise. In the registration mode M5, not only the data input from the input 35 is received, but also the data input from the mobile terminal 20 is received when taking an order from a customer located away from the electronic register 30. Thus, the wide range communicator 39B is turned on to perform wireless communication in a wide range with the mobile terminal 20, and the narrow range communicator 39A is turned off.

The settlement mode M6 is a mode of performing settlement processing of daily sales after the store is closed. In the settlement mode M6, the daily sales data and such like are transmitted from the electronic register 30 to the mobile terminal 20. Since the settlement processing is performed in a state in which the drawer 38 is open, the operating person needs to be located near the electronic register 30. In the settlement mode M6, the narrow range communicator 39A is turned on to perform wireless communication in a narrow range with the mobile terminal 20, and the wide range communicator 39B is turned off.

The setting mode M7 is a mode of performing setting processing in the electronic register 30 (for example, updating of software used in the electronic register 30, setting of unit prices of merchandise or the like). In the setting mode M7, the narrow range communicator 39A is turned on to perform wireless communication in a narrow range with the mobile terminal 20, and the wide range communicator 39B is turned off. The narrow range communicator 39A is used in the setting mode M7 because setting data will be rewritten while registration processing is being performed if it is possible to transmit setting data by using a same type of wireless communication (wireless communication in a wide range) during the registration processing in the registration mode M5.

In the check mode M1, the return mode M2, the calculator mode M3 and the OFF mode M4, the narrow range communicator 39A and the wide range communicator 39B are turned off so as not to perform wireless communication with the mobile terminal 20.

The CPU 31 switches to the mode corresponding to the specification operation according to the specification operation of the mode performed to the mode switch 36 by the user. Specifically, each time the rotation position of the mode switch 36 is switched, the CPU 31 switches to the mode corresponding to the switched rotation position. The CPU 31 performs predetermined processing (check processing, return processing, calculator processing, power-off processing, registration processing, settlement processing or setting processing) according to the switched mode.

The CPU 31 changes the power-on state and the power-off state of the narrow range communicator 39A and the wide range communicator 39B according to the mode which was switched in accordance with the specification operation to the mode switch 36. Specifically, the CPU 31 turns off the narrow range communicator 39A and the wide range communicator 39B when the check mode M1, the return mode M2, the calculator mode M3 or the OFF mode M4 is selected. The CPU 31 turns on the wide range communicator 39B and turns off the narrow range communicator 39A when the registration mode M5 is selected. The CPU 31 turns on the narrow range communicator 39A and turns off the wide range communicator 39B when the settlement mode M6 or the setting mode M7 is selected.

The printer 37 is a thermal printer which prints receipt data, data of electronic journal and such like on a sheet such as roll paper by control of the CPU 31.

The drawer 38 is a drawer which stores cash, gift certificates and such like. The drawer 38 is released by the control of CPU 31 at the time of closing (settlement) of the merchandise registration, for example.

The narrow range communicator 39A is configured by including an antenna, a demodulating circuit, a signal processing circuit and such like, and performs direct wireless communication in a narrow range with the mobile terminal 20 by a wireless communication system such as a Bluetooth.

The wide range communicator 39B is configured by including an antenna, a demodulating circuit, a signal processing circuit and such like, and performs direct wireless communication in a wide range with the mobile terminal 20 by a wireless communication system such as a Wi-Fi.

The storage 40 is configured by including a nonvolatile semiconductor memory. The storage 40 stores sales data, various types of setting information and suchlike. The storage 40 has a register software storage area 401. The register software storage area 401 stores a software program for causing the electronic register 30 to achieve various functions (hereinafter, referred to as register software) as the information used in the electronic register 30.

Figure 6:
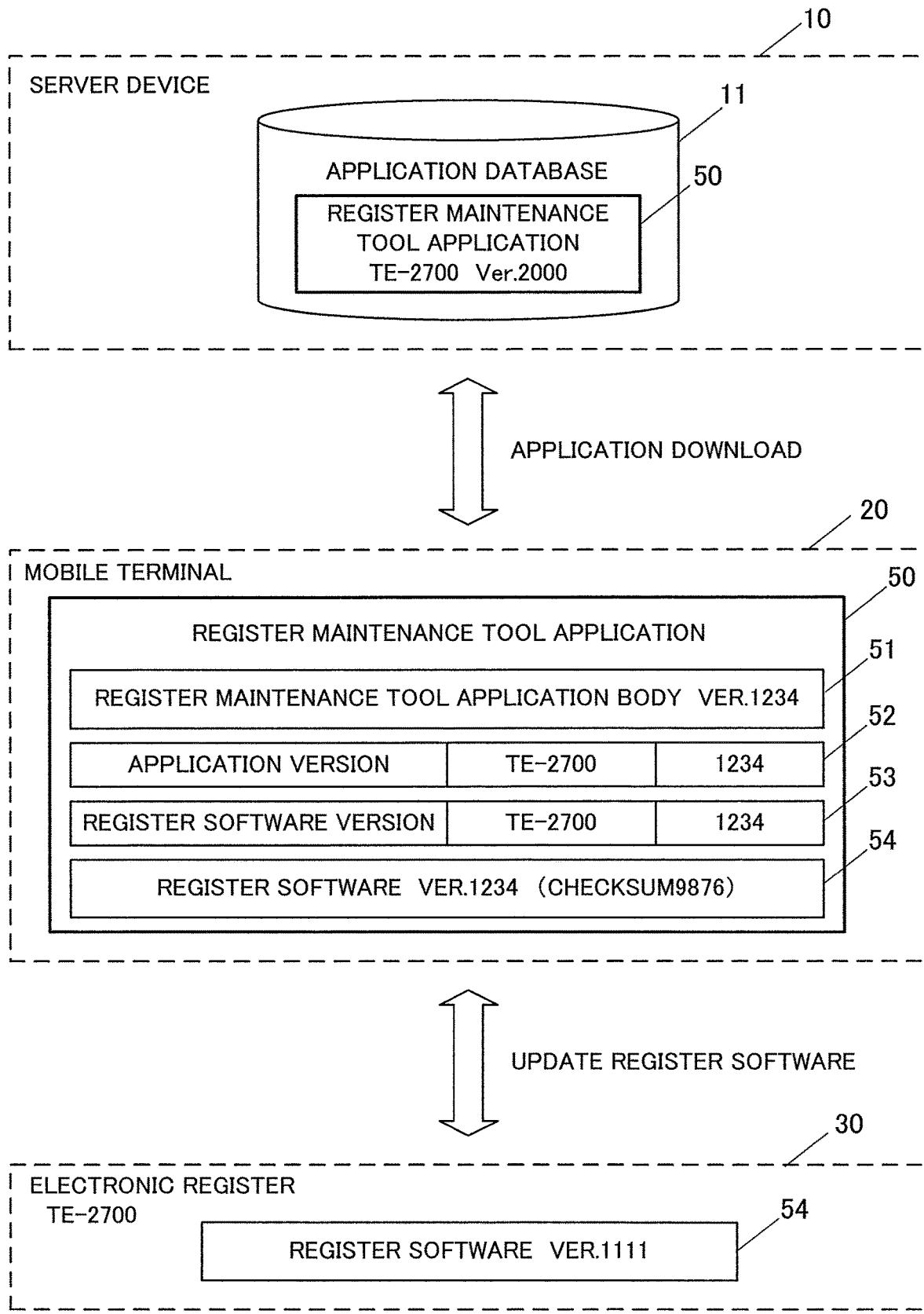
FIG. 6 is a view for explaining the summary of update processing of register software.

Next, the summary of the update processing of register software will be described with reference to FIG. 6.

The sever device 10 includes an application database 11 for storing and managing the application of the mobile terminal 20 such as the register maintenance tool application 50, and provides the application to the mobile terminal 20 according to a request from the mobile terminal 20. In the application database 11, the application used in the mobile terminal 20 is managed in association with the model name ("TE-2700" or the like) and the version number ("2000" or the like) of the mobile terminal 20.

The CPU 21 of the mobile terminal 20 downloads the register maintenance tool application 50 from the server device 10 as an external device via the communication network N. The register maintenance tool application 50 includes a register maintenance tool application body 51, an application version 52, a register software version 53 and register software 54 as the update data.

The register maintenance tool application body 51 is a program for executing the register maintenance tool application 50 in the mobile terminal 20.

The application version 52 includes the model name of the electronic register 30 which is the target of maintenance of the register maintenance tool application 50 and the version number of the register maintenance tool application 50.

The register software version 53 includes the model name of the electronic register 30 which uses the register software 54 and the version number of the register software 54.

The register software 54 is software (program) used in the electronic register 30.

That is, the CPU 21 downloads the register maintenance tool application 50 from the server device 10 via the communication network N in a state in which the register software 54 is included in the register maintenance tool application 50.

The application version 52 matches the register software version 53 in the register maintenance tool application 50. By downloading the register maintenance tool application 50 from the server device 10, the mobile terminal 20 can simultaneously obtain the register software 54 of the same version.

The CPU 31 of the electronic register 30 obtains the register software 54 from the mobile terminal 20, and updates the register software 54 used in the electronic register 30.

When the setting mode of updating the register software 54 is selected from among the plurality of modes by the mode switch 36 and the mode is switched to the setting mode, the CPU 31 starts, at a predetermined timing, update processing of obtaining the update data (here, the register software 54 itself) for updating the register software 54 from the mobile terminal 20 via the narrow range communicator 39A, and updating the register software 54 stored in the register software storage area 401 of the storage 40 on the basis of the obtained update data. As for the predetermined timing, the update processing may be started immediately after the mode is switched, after the user separately operates an update start button, or after the wireless connection to the mobile terminal 20 is made.

When the specification operation of specifying another mode instead of the setting mode is performed to the mode switch 36 by a user during the update processing of the register software 54, the mode is switched to the another mode after the update processing is finished.

Specifically, when the rotation position of the mode switch 36 is switched from the rotation position corresponding to the setting mode to the rotation position corresponding to the another mode during the update processing of the register software 54, the CPU 31 switches the mode to the another mode after the update processing is finished.

In other words, during the update processing of the register software 54, the CPU 31 makes the specification operation of the another mode invalid even if the user performs the specification operation of specifying the another mode instead of the setting mode to the mode switch 36.

When the update processing of the register software 54 is finished, the CPU 31 makes the invalid specification operation of the another mode valid to switch to the another mode.

During the update processing of the register software 54, the CPU 31 maintains the power-on state of the narrow range communicator 39A even if the specification operation of specifying the another mode instead of the setting mode is performed to the mode switch 36 by the user.

The CPU 31 causes the printer 37 to print the version number as the version information after update of the register software 54.

Next, the operation in the register maintenance system 100 will be described.

Figure 7:
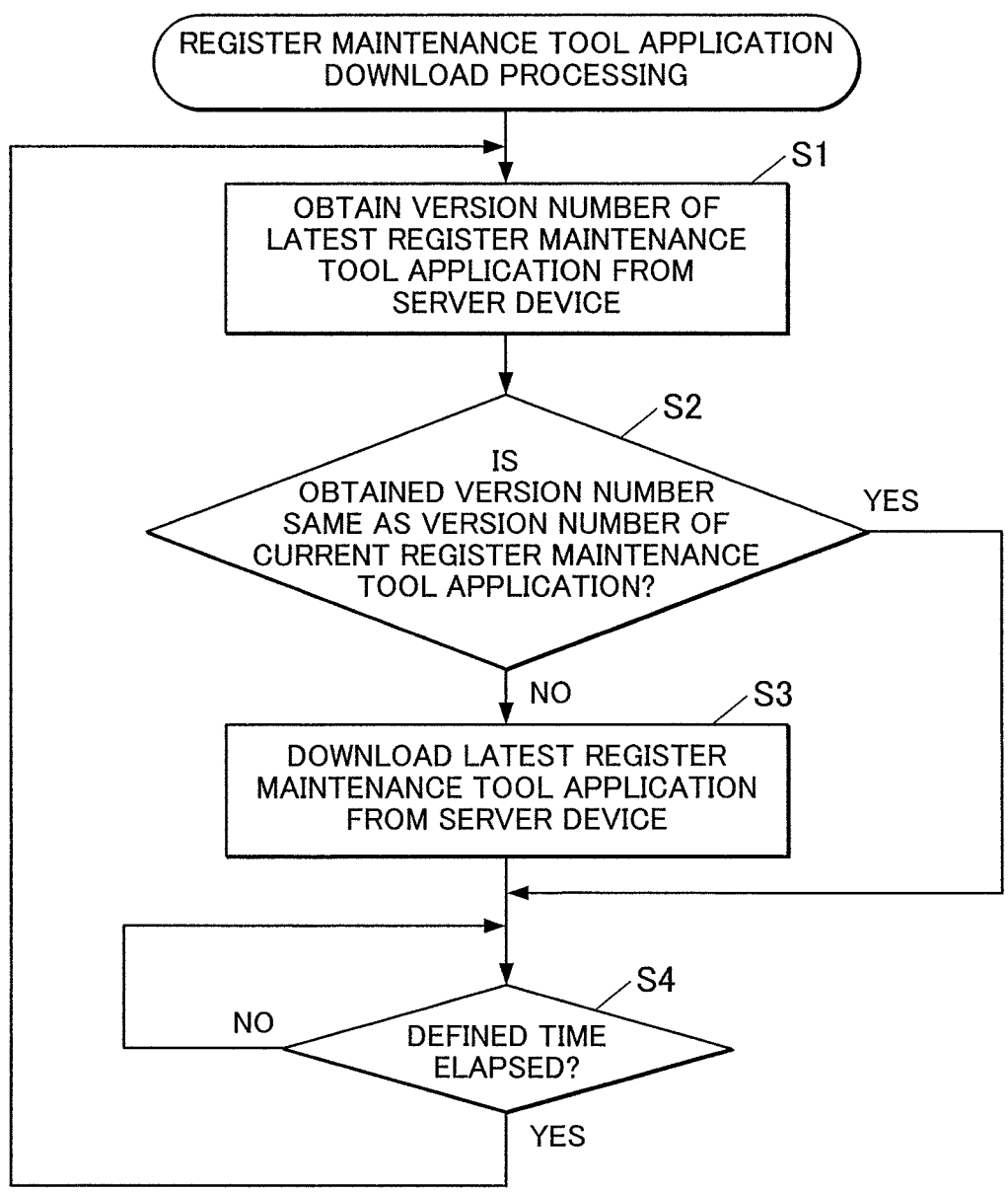
FIG. 7 is a flowchart showing register maintenance tool application download processing which is executed in the mobile terminal.

FIG. 7 is a flowchart showing register maintenance tool application download processing executed in the mobile terminal 20.

First, via the network communicator 28C, the CPU 21 inquires the version number of the latest register maintenance tool application (latest register maintenance tool application) from the server device 10 which is connected to the communication network N. Specifically, the CPU 21 transmits the model name of the electronic register 30 which is the maintenance target of the register maintenance tool application to the server device 10 via the network communicator 28C, and obtains the version number of the latest register maintenance tool application of the electronic register 30 of the model name from the server device 10 (step S1). At this time, the CPU 21 obtains the current date and time from the time counter 27, and stores the obtained date and time in the RAM 22.

Next, the CPU 21 reads out the version number of the current register maintenance tool application (current register maintenance tool application) which is stored in the application storage area 291 of the storage 29, and determines whether the version number of the latest register maintenance tool application obtained from the server device 10 is same as the version number of the current register maintenance tool application (step S2).

If the version number of the latest register maintenance tool application obtained from the server device 10 is different from the version number of the current register maintenance tool application (step S2: NO), the CPU 21 transmits an acquisition request of the latest register maintenance tool application to the server device 10 via the network communicator 28C, and downloads the latest register maintenance tool application from the server device 10 (step S3). The CPU 21 rewrites and stores the downloaded latest register maintenance tool application in the application storage area 291 of the storage 29.

In step S2, if the version number of the latest register maintenance tool application obtained from the server device 10 is same as the version number of the current register maintenance tool application (step S2: YES), that is, if the latest register maintenance tool application is already downloaded in the mobile terminal 20 or after step S3, the CPU 21 obtains the current date and time from the time counter 27 and determines whether a defined time has elapsed from the latest processing of step S1 (step S4).

If the defined time has not elapsed from the latest processing of step S1 (step S4: NO), the CPU 21 returns to step S4, and repeats the processing.

In step S4, if the defined time has elapsed from the latest processing of step S1 (step S4: YES), the CPU 21 returns to step S1 and repeats the processing.

In such a way, the mobile terminal 20 checks every defined time whether the latest version of the register maintenance tool application exists in the server device 10, and downloads the latest register maintenance tool application if the latest register maintenance tool application is not yet obtained.

Here, the mobile terminal 20 checks every defined time whether the latest version of the register maintenance tool application exists in the server device 10. However, the check regarding whether the latest version of the register maintenance tool application exists may be performed irregularly.

Figure 8:
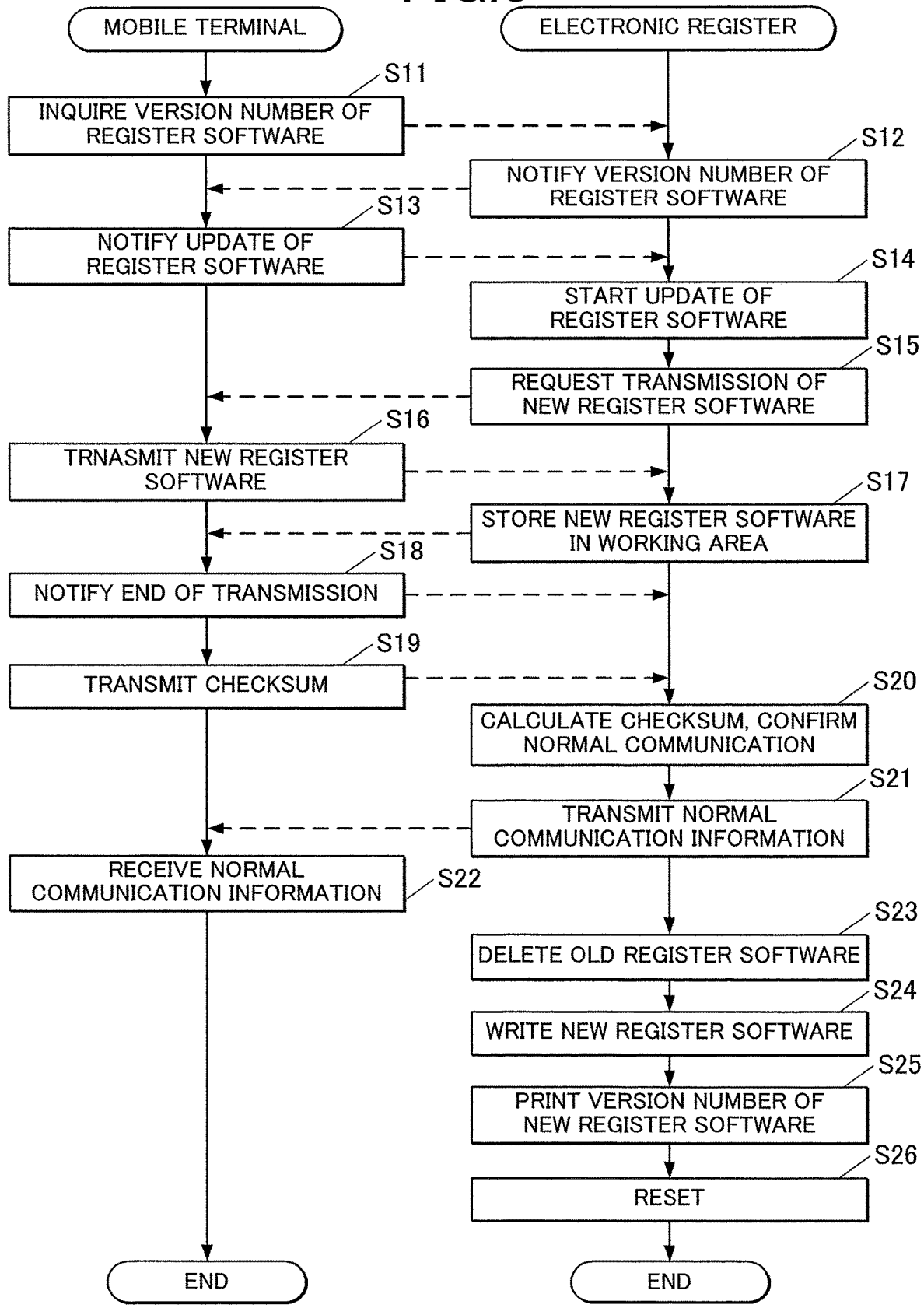
FIG. 8 is a ladder chart showing register software update processing which is executed in the mobile terminal and the electronic register.

FIG. 8 is a ladder chart showing register software update processing which is executed in the mobile terminal 20 and the electronic register 30. The register software update processing is performed in accordance with the operation by a service engineer after the close of business in the store, for example.

When the register software update processing is executed, the setting mode is selected in the mode switch 36 and the narrow range communicator 39A is turned on as a communication method with the mobile terminal 20 in the electronic register 30. Certification of the connected device is performed between the mobile terminal 20 and the electronic register 30.

In such a situation, when confirmation of update of the register software is instructed from the operator 25 by the register maintenance tool application in the mobile terminal 20, the CPU 21 inquires the version number of the register software from the electronic register 30 via the narrow range communicator 28A (step S11).

In the electronic register 30, the CPU 31 reads out the version number of the register software stored in the register software storage area 401 in the storage 40, and notifies the mobile terminal 20 of the version number of the register software via the narrow range communicator 39A (step S12).

In the mobile terminal 20, the CPU 21 obtains the version number of the register software which is currently used in the electronic register 30 via the narrow range communicator 28A. The CPU 21 reads out the version number of the register software included in the register maintenance tool application stored in the application storage area 291 in the storage 29, and determines whether the version number of the register software obtained from the electronic register 30 is same as the version number of the register software in the mobile terminal 20. If the version number of the register software obtained from the electronic register 30 is same as the version number of the register software in the mobile terminal 20, update of the register software is not necessary. Thus, the processing ends without updating the register software.

On the other hand, if the version number of the register software obtained from the electronic register 30 is different from the version number of the register software in the mobile terminal 20, the CPU 21 of the mobile terminal 20 causes the display 24 to display an update confirmation screen of the register software.

Figure 9:
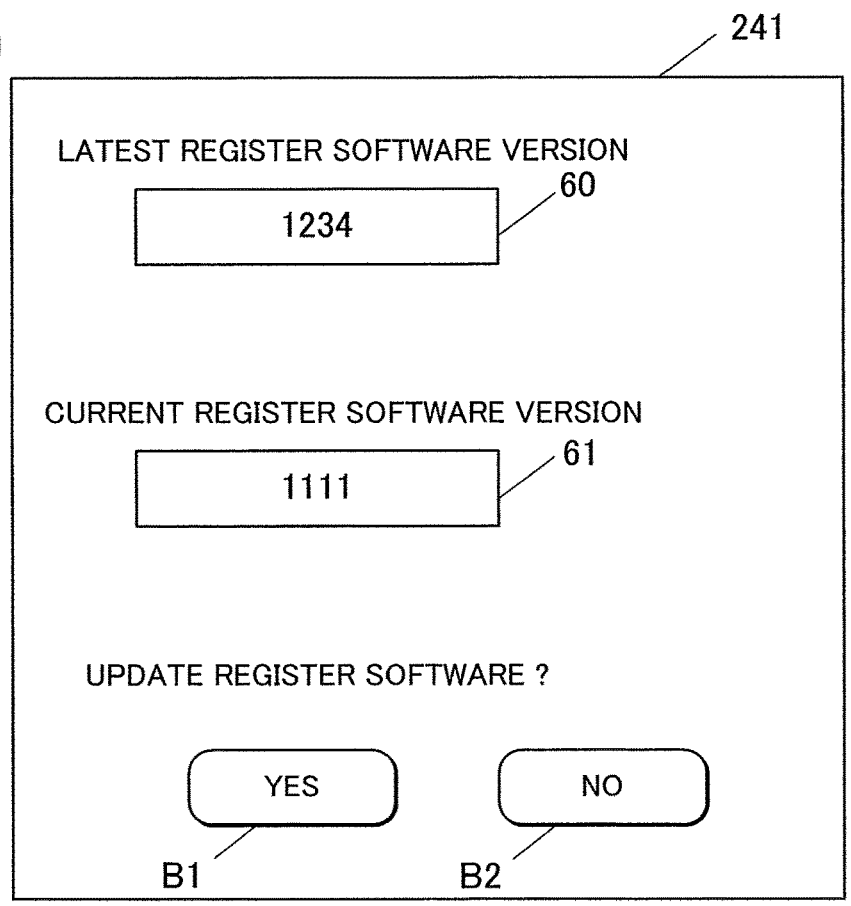
FIG. 9 is an example of an update confirmation screen of register software displayed on the mobile terminal.

FIG. 9 shows an example of the update confirmation screen 241 of the register software displayed on the display 24. The update confirmation screen 241 of the register software includes the version number 60 of the latest register software which is prepared in the mobile terminal 20, the version number 61 of the register software which is currently used in the electronic register 30, and a YES button B1 and a NO button B2 for instructing whether to update the register software.

When the YES button B1 is pressed by the operation from the operator 25 in the update confirmation screen 241 of the register software, the CPU 21 of the mobile terminal 20 transmits a register software update notice to the electronic register 30 via the narrow range communicator 28A (step S13).

In the electronic register 30, when the register software update notice is received via the narrow range communicator 39A, the CPU 31 starts update of the register software (step S14). The CPU 31 transmits a transmission request of the new register software to the mobile terminal 20 via the narrow range communicator 39A (step S15).

In the mobile terminal 20, when the transmission request of the new register software is received from the electronic register 30 via the narrow range communicator 28A, the CPU 21 reads out the new register software included in the register maintenance tool application which is stored in the application storage area 291 of the storage 29, and transmits the new register software to the electronic register 30 via the narrow range communicator 28A (step S16).

In the electronic register 30, when the new register software is received via the narrow range communicator 39A, the CPU 31 stores the new register software in the working area of the RAM 32 (step S17).

The steps S16 and S17 are repeated until the end of the transmission of the new register software.

When the transmission of the new register software from the mobile terminal 20 to the electronic register 30 is finished, the CPU 21 of the mobile terminal 20 transmits a transmission end notice to the electronic register 30 via the narrow range communicator 28A (step S18).

Next, the CPU 21 transmits a checksum to the electronic register 30 via the narrow range communicator 28A (step S19).

In the electronic register 30, when the transmission end notice and the checksum are received via the narrow range communicator 39A, the CPU 31 calculates the checksum from data of the new register software and confirms normal communication (step S20). If a communication error is detected as a result of the calculation of the checksum, the CPU 31 transmits error information to the mobile terminal 20 via the narrow range communicator 39A and resets the electronic register 30.

On the other hand, if the normal communication is confirmed as a result of the calculation of the checksum, the CPU 31 transmits normal communication information to the mobile terminal 20 via the narrow range communicator 39A (step S21).

In the mobile terminal 20, normal communication information is received via the narrow range communicator 28A (step S22), and the processing ends.

In the electronic register 30, the CPU 31 deletes the old register software from the register software storage area 401 of the storage 40 (step S23), and thereafter writes the new register software which is temporarily stored in the working area in the RAM 32 into the register software storage area 401 of the storage 40 (step S24).

Next, the CPU 31 controls the printer 37 to print the version number of the new register software on a sheet (step S25).

Figure 10:
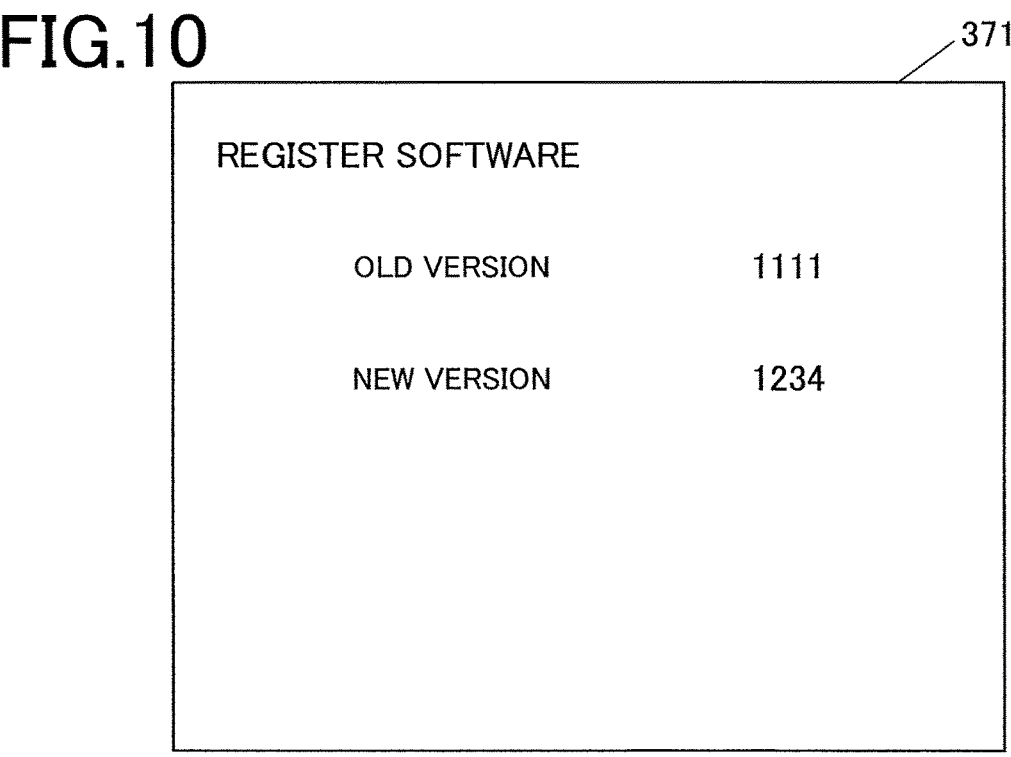
FIG. 10 is a printing example of version numbers.

FIG. 10 shows a printing example 371 of the version number. In the printing example 371, the version number "1111" of the old register software and the version number "1234" of the new register software are printed.

Next, the CPU 31 resets the electronic register 30 (step S26).

Then, the register software update processing ends.

Figure 11:
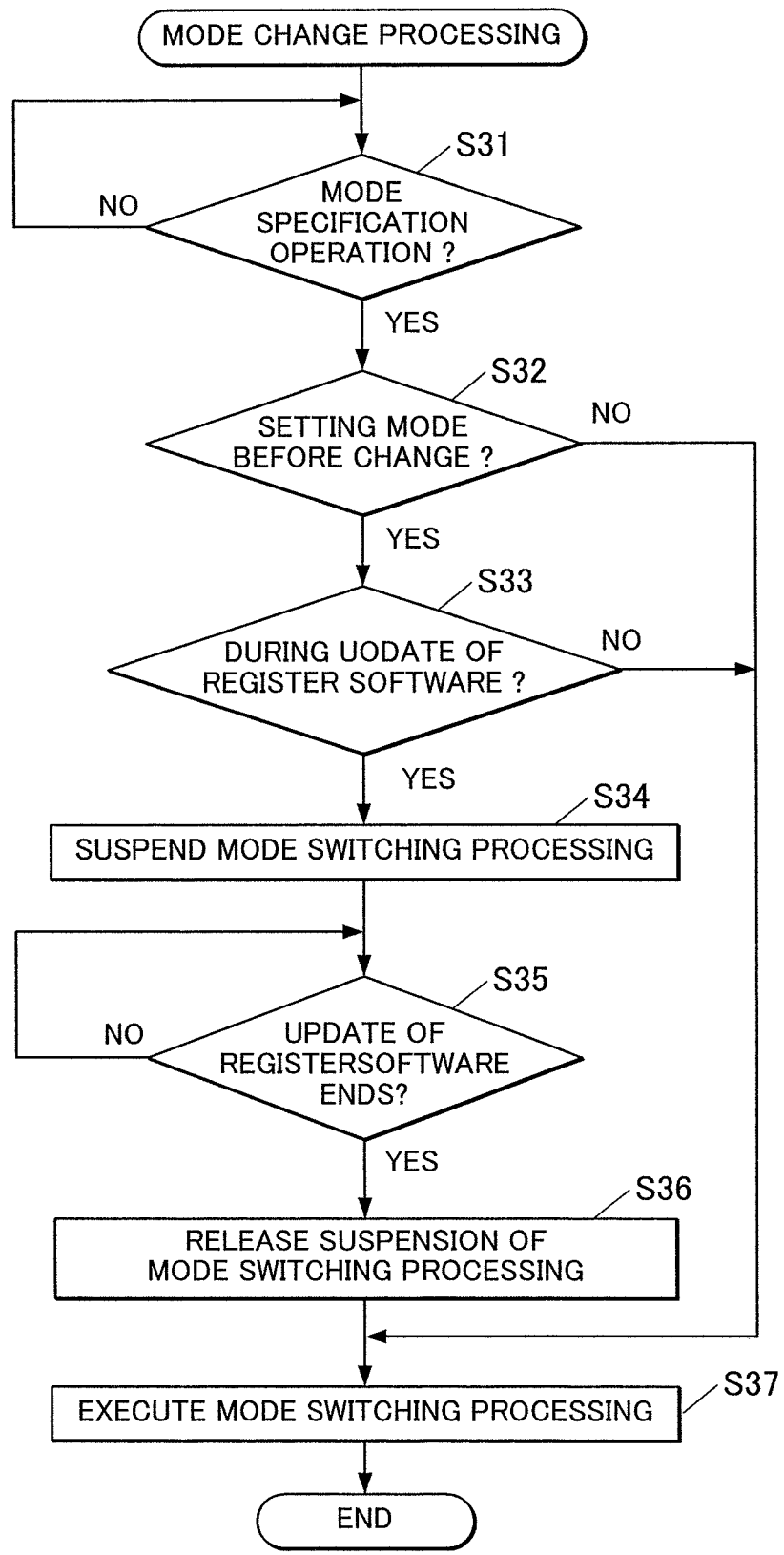
FIG. 11 is a flowchart showing mode change processing which is executed in the electronic register.

FIG. 11 is a flowchart showing mode change processing which is executed in the electronic register 30.

First, the CPU 31 determines whether a mode specification operation was performed in the mode switch 36 (step S31). If the mode specification operation was not performed (step S31: NO), the CPU 31 returns to step S31.

In step S31, if the mode specification operation was performed (step S31: YES), the CPU 31 determines whether the mode before mode change was a setting mode in the mode switch 36 (step S32).

If the mode before mode change was the setting mode (step S32: YES), the CPU 31 determines whether the register software is currently being updated (step S33). The "currently being updated" means that the processing is in the middle of any one step in the register software update processing shown in FIG. 8.

If the register software is currently being updated (step S33: YES), the CPU 31 suspends the mode switching processing (step S34). The mode switching processing includes changing processing of the on/off of the narrow range communicator 39A and the wide range communicator 39B according to the mode change and various types of processing according to the mode. That is, while the register software is received from the mobile terminal 20 and the register software is updated, the CPU 31 makes the specification operation of the mode by the mode switch 36 invalid. While the register software is received from the mobile terminal 20 and the register software is updated, the CPU 31 maintains the power-on state of the narrow range communicator 39A even if the specification operation of the mode by the mode switch 36 was performed.

The CPU 31 causes the main display 34A to display a message such as "software is being updated".

Next, the CPU 31 determines whether the update of the register software is finished (step S35). Specifically, the CPU 31 determines whether all the register software update processing shown in FIG. 8 is finished. If the update of the register software is not finished (step S35: NO), the CPU 31 returns to step S35.

In step S35, if the update of the register software is finished (step S35: YES), the CPU 31 releases the suspension of the mode switching processing (step S36), and executes the mode switching processing (step S37). Specifically, the CPU 31 changes the on/off of the narrow range communicator 39A and the wide range communicator 39B according to the mode after the mode change, and executes various types of processing according to the mode. That is, the CPU 31 makes the invalid specification operation of the mode valid when the update of the registration software is finished.

If the mode before mode change is other than the setting mode in step S32 (step S32: NO) or if the register software is not currently being updated in step S33 (step S33: NO), the CPU 31 executes the mode switching processing (step S37).

Then, the mode change processing ends.

As described above, when a specification operation of specifying another mode instead of the setting mode is performed to the mode switch 36 during the update processing of register software in the setting mode, switching to the another mode is performed after the update processing is finished. Thus, the register software stored in the electronic register 30 can be updated smoothly.

That is, during the update processing of register software, even if the specification operation of specifying another mode instead of the setting mode is performed, the specification operation of the another mode is made invalid. Thus, update processing of register software can be continued.

In the electronic register 30, when the update processing of the register software is finished, the invalid specification operation of the mode is made valid. Thus, mode switching can be performed promptly after the update processing of the register software is finished.

While the register software is received from the mobile terminal 20 via the narrow range communicator 39A and the register software is updated, the power-on state of the narrow range communicator 39A is maintained even if the specification operation of specifying another mode instead of the setting mode is performed. Thus, it is possible to prevent the break of the communication with the mobile terminal 20 during the update processing of register software. Thus, the update of register software can be performed smoothly in the electronic register 30 which is not connected to the communication network N.

Since the version number after the update of register software is printed, it is possible to present the version number of the register software in the electronic register 30 to the user, and leave the update result of the register software as a document.

In the server device 10, since the register maintenance tool application is managed in a state of including the register software, the mobile terminal 20 can obtain the register software to be provided to the electronic register 30 by downloading the register maintenance tool application with a method similar to a conventional method.

Next, a modification example of the embodiment according to the present invention will be described.

The register maintenance system in the modification example has a similar configuration to that of the register maintenance system 100 shown in the embodiment. Thus, FIGS. 1 to 5 can be used, and illustration and explanation of the configuration are omitted. Hereinafter, the configuration and processing characteristic to the modification example will be described.

In the modification example, there is described a case of including master data which is data for executing the register software instead of the register software in the register maintenance tool application which the mobile terminal 20 downloads from the server device 10. Here, as the master data, merchandise master data which is set for each season is used. The merchandise and the price are associated with the merchandise master data.

Figure 12:
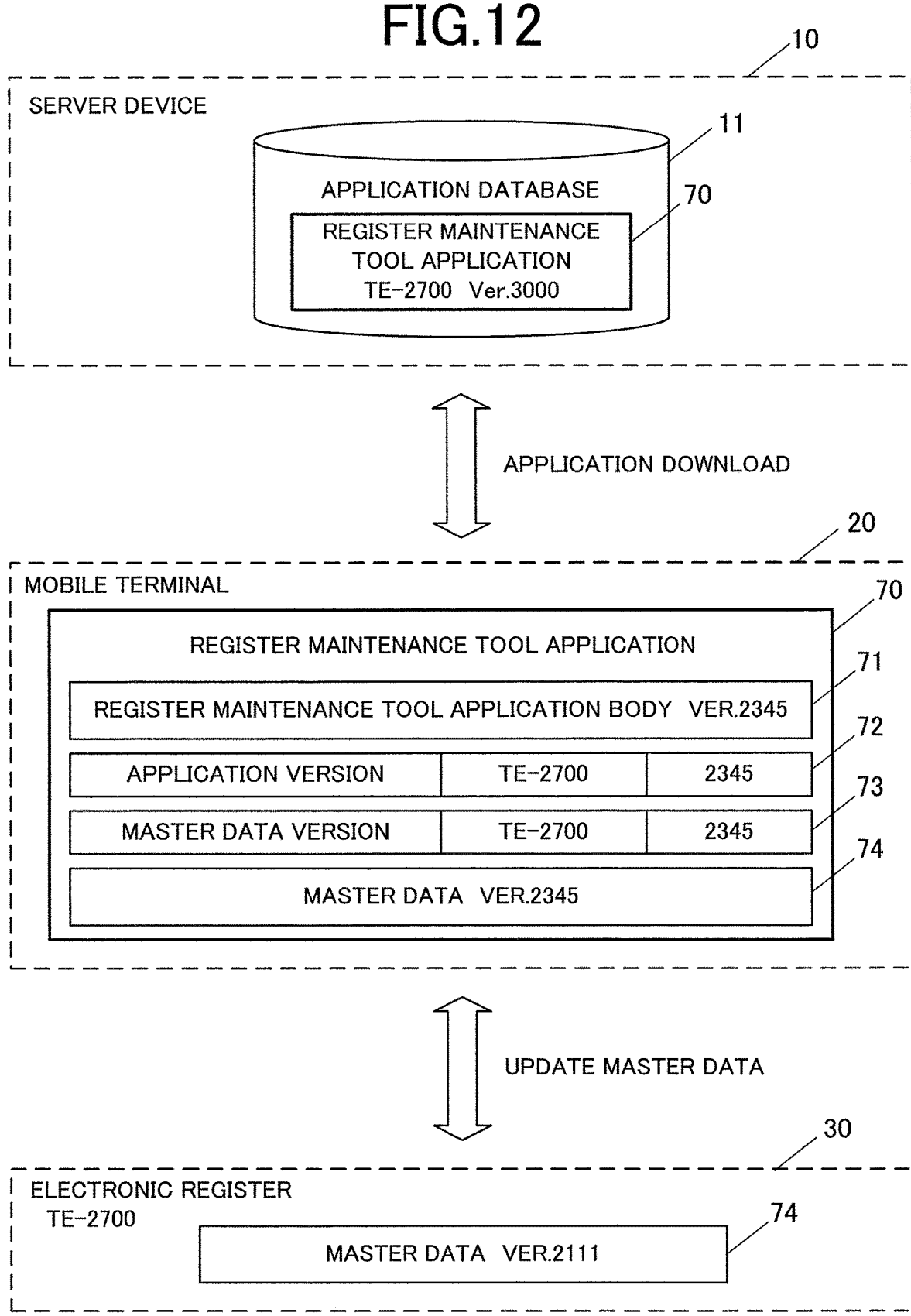
FIG. 12 is a view for explaining the summary of update processing of master data in a modification example.

With reference to FIG. 12, the summary of the update processing of the master data will be described.

The server device 10 includes an application database 11 for storing and managing an application of the mobile terminal 20 such as a register maintenance tool application 70, and provides the application to the mobile terminal 20 according to a request from the mobile terminal 20. In the application database 11, the application used in the mobile terminal 20 is managed in association with the model name ("TE-2700" or the like) of the mobile terminal 20 and the version number ("3000" or the like).

The CPU 21 of the mobile terminal 20 downloads the register maintenance tool application 70 from the server device 10 via the communication network N. The register maintenance tool application 70 includes a register maintenance tool application body 71, an application version 72, a master data version 73, and master data 74 as the update data.

The register maintenance tool application body 71 is a program for executing the register maintenance tool application 70 in the mobile terminal 20.

The application version 72 includes the model name of the electronic register 30 which is the maintenance target of the register maintenance tool application 70 and the version number of the register maintenance tool application 70.

The master data version 73 includes the model name of the electronic register 30 which uses the master data 74 and the version number of the master data 74.

The master data 74 is merchandise master data used in the electronic register 30.

That is, the CPU 21 downloads the register maintenance tool application 70 from the server device 10 via the communication network N in a state in which the master data 74 is included in the register maintenance tool application 70.

In the register maintenance tool application 70, the application version 72 matches the master data version 73. By downloading the register maintenance tool application 70 from the server device 10, the mobile terminal 20 can simultaneously obtain the master data 74 of the same version.

The CPU 31 of the electronic register 30 obtains the master data 74 from the mobile terminal 20, and updates the master data 74 used in the electronic register 30.

When the setting mode of updating the master data 74 is selected from among the plurality of modes by the mode switch 36 and the mode is switched to the setting mode, the CPU 31 starts, at a predetermined timing, update processing of obtaining the update data (here, master data 74 itself) for updating the master data 74 from the mobile terminal 20 via the narrow range communicator 39A and updating the master data 74 which is stored in the storage 40 on the basis of the obtained update data.

When a specification operation of specifying another mode instead of the setting mode is performed to the mode switch 36 by a user during the update processing of the master data 74, the CPU 31 switches the mode to the another mode after the update processing is finished.

Specifically, when the rotation position of the mode switch 36 is switched to the rotation position corresponding to the another mode from the rotation position corresponding to the setting mode during the update processing of the master data 74, the CPU 31 switches the mode to the another mode after the update processing is finished.

In other words, during the update processing of the master data 74, the CPU 31 makes the specification operation of the another mode invalid even if the specification operation of specifying the another mode instead of the setting mode is performed by the user to the mode switch 36.

When the update processing of the master data 74 is finished, the CPU 31 makes the invalid specification operation of the another mode valid, and switches the mode to the another mode.

During the update processing of the master data 74, the CPU 31 maintains the power-on state of the narrow range communicator 39A even if the specification operation of specifying the another mode instead of the setting mode is performed to the mode switch 36 by the user.

The CPU 31 causes the printer 37 to print the version number as the version information after the update of the master data 74.

Next, the operation in the modification example will be described.

The register maintenance tool application download processing (see FIG. 7) which is executed in the mobile terminal 20 is same as that of the embodiment.

As for the master data update processing executed in the mobile terminal 20 and the electronic register 30, the "register software" is read as the "master data" in the register software update processing shown in FIG. 8. The master data update processing is processing which is executed in accordance with the operation by an owner or a manager of the store after the daily settlement processing, for example.

Also, as for the mode change processing executed in the electronic register 30, the "register software" is read as the "master data" in the mode change processing shown in FIG. 11.

As described above, according to the modification example, when the specification operation of specifying another mode instead of the setting mode is performed to the mode switch 36 during the update processing of master data in the setting mode, the mode is switched to the another mode after the update processing is finished. Thus, it is possible to update the master data stored in the electronic register 30 smoothly.

That is, during the update processing of the master data, the specification operation of another mode is made invalid even if the specification operation of specifying the another mode instead of the setting mode is performed. Thus, the update processing of the master data can be continued.

In the electronic register 30, the invalid specification operation of the mode is made valid when the update processing of the master data is finished. Thus, it is possible to switch the mode promptly after the update processing of the master data is finished.

While the master data is received from the mobile terminal 20 via the narrow range communicator 39A and the master data is updated, the power-on state of the narrow range communicator 39A is maintained even if the specification operation of specifying another mode instead of the setting mode is performed. Thus, it is possible to prevent the break of communication with the mobile terminal 20 during the update processing of the master data. Thus, it is possible to update the master data smoothly in the electronic register 30 which is not connected to the communication network N.

Since the version number after the update of the master data is printed, it is possible to present the version number of the master data in the electronic register 30 to the user and leave the update result of the master data as a document.

In the server device 10, the register maintenance tool application is managed in a state of including the master data. Thus, the mobile terminal 20 can obtain the master data to be provided to the electronic register 30 by downloading the register tool application by a method similar to a conventional method.

In the modification example, the same version number as that of the register maintenance tool application including the master data is used as the version information of the master data. However, the version information such as "2017 spring" and "2017 summer" may be provided in association with the application period of the master data.

Next, another modification example of the embodiment according to the present invention will be described.

Since the register maintenance system in the another modification example has nearly same configurations as those of the register maintenance system 100 shown in the embodiment, FIGS. 1 to 3 are used to omit the explanation for the same configurations. Hereinafter, the configuration and processing characteristic to the another modification example will be described.

In the another modification example, there is described a case where the electronic register 30 does not have the mode switch 36 and the mode switching is instructed by the operation on the touch panel.

The input 35 has a touch panel in which transparent electrodes are arranged in a grid pattern in such a manner as to cover the surface of the main display 34A, detects the position pressed by a finger, a touch pen or the like, and outputs the position information to the CPU 31 as the operation information.

The CPU 31 causes the main display 34A to display a mode selection screen for a user to perform a specification operation (selection) of an arbitrary mode from among a plurality of modes in the electronic register 30.

Figure 13:
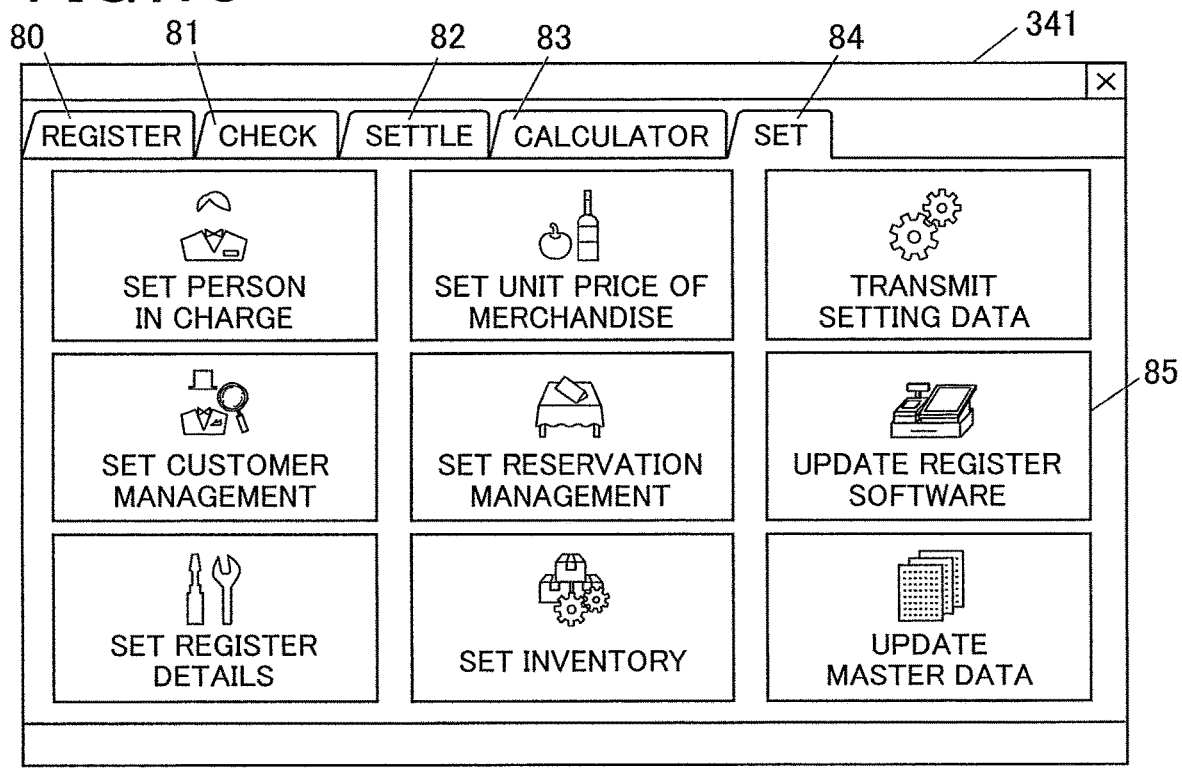
FIG. 13 is an example of a mode selection screen displayed on the electronic register in another modification example.

FIG. 13 shows an example of a mode selection screen 341 which is displayed on the main display 34A. The mode selection screen 341 is provided with a registration tab 80, a check tab 81, a settlement tab 82, a calculator tab 83 and a setting tab 84. By selecting any tab from among the registration tab 80, the check tab 81, the settlement tab 82, the calculator tab 83 and the setting tab 84 with an operation from the input 35 (touch panel), the mode can be switched to the mode corresponding to the tab. That is, the input 35 functions as an operator.

The CPU 31 switches the mode to the mode corresponding to a specification operation according to the specification operation of the mode in the mode selection screen 341. The CPU 31 performs predetermined processing according to the switched mode.

The CPU 31 causes a display screen to be displayed, the display screen corresponding to the mode which was switched according to the specification operation in the mode selection screen 341. For example, the CPU 31 causes the main display 34A to display a menu screen of the mode corresponding to the tab which was selected in the mode selection screen 341. FIG. 13 is an example of a case where the setting tab 84 is selected and the display screen corresponding to the setting mode is displayed.

The CPU 31 changes the power-on state and the power-off state of the narrow range communicator 39A and the wide range communicator 39B according to the mode which was switched in accordance with the specification operation in the mode selection screen 341.

When the setting tab 84 is selected by an operation from the input 35 in the mode selection screen 341, the CPU 31 turns on the narrow range communicator 39A and turns off the wide range communicator 39B. Furthermore, in a state in which the update register software 85 is selected from the menu included in the setting tab 84, the CPU 31 obtains the register software from the mobile terminal 20 and updates the register software used in the electronic register 30.

When the setting mode of updating the register software is selected from among a plurality of modes by an operation from the input 35 in the mode selection screen 341 and the mode is switched to the setting mode, the CPU 31 starts, at a predetermined timing, the update processing of obtaining the update data for updating the register software from the mobile terminal 20 via the narrow range communicator 39A and updating the register software stored in the register software storage area 401 of the storage 40 on the basis of the obtained update data.

During the update processing of the register software, the CPU 31 makes the specification operation of another mode invalid even if the specification operation of specifying the another mode instead of the setting mode is performed to the input 35 by a user.

Figure 14:
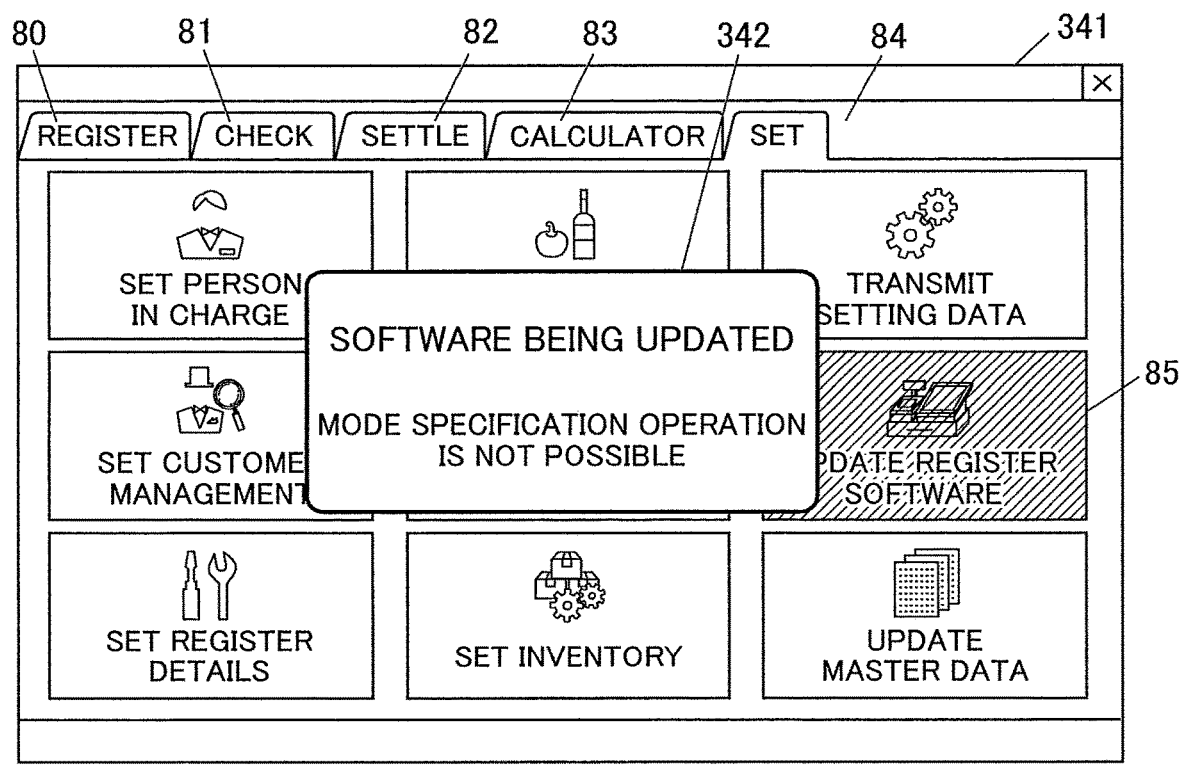
FIG. 14 is an example of a message screen displayed on the electronic register.

For example, as shown in FIG. 14, the CPU 31 causes a message screen 342 such as "software being updated, mode specification operation is not possible" to be displayed on the mode selection screen 341 during the update of the register software. During the update of the register software, even if the registration tab 80, the check tab 81, the settlement tab 82 or the calculator tab 83 is touched by an operation from the input 35 on the mode election screen 341, the CPU 31 makes no reaction and does not receive the specification operation of the mode.

Next, the operation in the another modification example will be described.

The register maintenance tool application download processing (see FIG. 7) executed in the mobile terminal 20 and the register software update processing (see FIG. 8) executed in the mobile terminal 20 and the electronic register 30 are similar to those of the embodiment.

Figure 15:
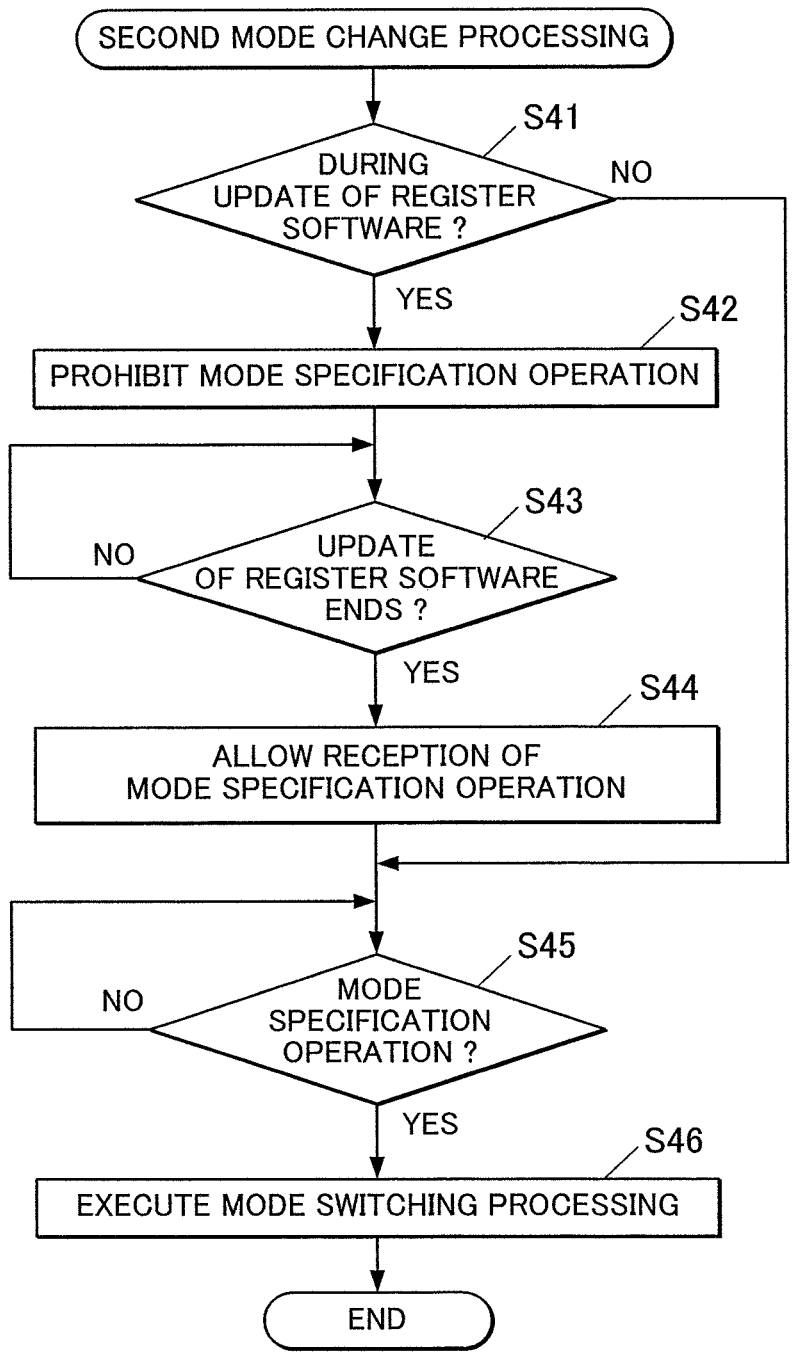
FIG. 15 is a flowchart showing second mode change processing which is executed in the electronic register.

In the another modification example, second mode change processing shown in FIG. 15 is performed in the electronic register 30 instead of the mode change processing (see FIG. 11) in the embodiment.

First, the CPU 31 determines whether the register software is currently being updated in a state in which the setting tab 84 (setting mode) is selected on the mode selection screen 341 displayed on the main display 34A (step S41).

If the register software is currently being updated (step S41: YES), the CPU 31 prohibits the mode specification operation in the mode selection screen 341 (step S42). Specifically, during the update of the register software, even if the register tab 80, the check tab 81, the settlement tab 82 or the calculator tab 83 is touched by the operation from the input 35, the CPU 31 does not receive the mode specification operation and makes the mode specification operation invalid.

Next, the CPU 31 determines whether the update of the register software is finished (step S43). If the update of the register software is not finished (step S43: NO), the CPU 31 returns to step S43.

In step S43, if the update of the register software is finished (step S43: YES), the CPU 31 allows the reception of the mode specification operation from the input 35 on the mode selection screen 341 (step S44).

After step S44 or if the register software is not currently being updated in step S41 (step S41: NO), the CPU 31 determines whether the mode specification operation from the input 35 was performed on the mode selection screen 341 (step S45). If the mode specification operation was not performed (step S45: NO), the CPU 31 returns to step S45.

In step S45, if the mode specification operation was performed (step S45: YES), the CPU 31 executes mode switching processing (step S46).

Then, the second mode change processing ends.

As described above, according to the another modification example, the setting mode is selected by the operation from the input 35 on the mode selection screen 341, and the specification operation of another mode is made invalid during the update processing of the register software. Thus, it is possible to smoothly update the register software stored in the electronic register 30.

Though the another modification example has been described for a case of updating the register software used in the electronic register 30, the master data may be updated similarly to the modification example in the register maintenance system shown in the another modification example.

The above description of the embodiment is an example of the information processing device and the information update system according to the present invention, and thus the present invention is not limited to the description. The detailed configurations and the detailed operations of the components forming the devices may be appropriately modified within the scope of the present invention.

For example, the direct wireless communication by the narrow range communicator 28A of the mobile terminal 20 and the narrow range communicator 39A of the electronic register 30 is not limited to the Bluetooth. The short-distance wireless communication such as the IrDA (Infrared Data Association), the NFC (Near Field Communication), the RFID (Radio Frequency Identifier) and the ZigBee (Registered Trademark) may be used.

When the register software or the master data is updated in the electronic register 30, as a working area for temporarily storing the register software or the master data which was received from the mobile terminal 20, external storage media such as an SD card inserted into the electronic register 30 may be used.

As the update data used in updating the register software or the master data, difference data from the register software or the master data of the old version may be used.

Also in the above embodiment or the modification example, the display screen corresponding to the switched mode may be displayed on the main display 34A or the customer display 34B of the electronic register 30.

As for a computer readable medium storing programs for executing processing, a portable-type storage medium such as a CD-ROM can also be applied as well as the ROM and the nonvolatile memory. Furthermore, as a medium for providing data related to a program via a communication circuit, a carrier wave can be applied.

Although embodiments of the present invention have been described, the scope of the present invention is not limited to the above described embodiments and includes the scope of the present invention that is described in the claims and the equivalents thereof.

What is claimed is:

1. An information processing device, comprising:
an operator operable by a user to perform a specification operation of specifying an arbitrary mode from among a plurality of modes;
a communicator which selectively performs communication by one of a first communication system and a second communication system; and
a processor which starts, at a predetermined timing, update processing of obtaining update data for updating a predetermined program or execution data of the program from a first external terminal that is in a communication connection with the information processing device via the first communication system and updating the program or the execution data based on the obtained update data in response to specification of a predetermined mode by a specification operation performed by the user via the operator,
wherein, in response to specification of another mode different from the predetermined mode by a specification operation performed by the user via the operator during the update processing, after the update processing is finished, the processor disconnects the communication connection with the first external terminal and starts a communication connection with a second external terminal via the second communication system, and switches to the another mode.

2. The information processing device according to claim 1, wherein the another mode is a sales registration mode for receiving sales registration data from the second external terminal.

3. The information processing device according to claim 1, wherein a range over which the second communication system performs communication is wider than a range over which the first communication system performs communication.

4. The information processing device according to claim 1, wherein:
the operator comprises a rotary mode switching switch having a plurality of predetermined rotation positions each corresponding to a respective one of the plurality of modes, and
when the rotation position of the rotary mode switching switch is switched during the update processing from the rotation position corresponding to the predetermined mode to the rotation position corresponding to the another mode, after the update processing is finished, the processor disconnects the communication connection with the first external terminal and starts the communication connection with the second external terminal via the second communication system, and switches to the another mode.

5. The information processing device according to claim 1, wherein, when the specification operation specifying the another mode is performed by the user via the operator during the update processing, the processor makes the specification operation specifying the another mode invalid.

6. An information processing method for an information processing device including an operator operable by a user to perform a specification operation of specifying an arbitrary mode from among a plurality of modes, and a communicator which selectively performs communication by one of a first communication system and a second communication system, the method comprising:
switching to a mode specified by a specification operation performed by the user via the operator; and
starting, at a predetermined timing, update processing of obtaining update data for updating a predetermined program or execution data of the program from a first external terminal that is in a communication connection with the information processing device via the first communication system and updating the program or the execution data based on the obtained update data in response to specification of a predetermined mode by a specification operation performed by the user in the switching,
wherein in the switching, in response to specification of another mode different from the predetermined mode by a specification operation performed by the user via the operator during the update processing, after the update processing is finished, the communication connection with the first external terminal is disconnected and a communication connection with a second external terminal via the second communication system is started, and the mode is switched to the another mode.

7. A non-transitory computer readable storage medium storing a program for controlling an information processing device including an operator operable by a user to perform a specification operation of specifying an arbitrary mode from among a plurality of modes, and a communicator which selectively performs communication by one of a first communication system and a second communication system, wherein the program, when executed by a computer of the information processing device, controls the computer to perform operations comprising:
- switching to a mode specified by a specification operation performed by the user via the operator; and
- starting, at a predetermined timing, update processing of obtaining update data for updating a predetermined program or execution data of the program from a first external terminal that is in a communication connection with the information processing device via the first communication system and updating the program or the execution data based on the obtained update data in response to specification of a predetermined mode by a specification operation performed by the user in the switching,
- wherein in the switching, in response to specification of another mode different from the predetermined mode by a specification operation performed by the user via the operator during the update processing, after the update processing is finished, the communication connection with the first external terminal is disconnected and a communication connection with a second external terminal via the second communication system is started, and the mode is switched to the another mode.

* * * * *